(12) United States Patent
Ziegler et al.

(10) Patent No.: US 10,642,043 B2
(45) Date of Patent: May 5, 2020

(54) HOLOGRAPHIC OPTICAL ELEMENT DESIGN AND MANUFACTURING

(71) Applicant: INTEL CORPORATION, Santa Clara, CA (US)

(72) Inventors: David Ziegler, Lausanne (CH); Mickael Guillaumee, Neuchatel (CH); Eric Tremblay, Saint Sulpice (CH); Christophe Moser, Lausanne (CH); Frederic Montfort, Lausanne (CH)

(73) Assignee: INTEL CORPORATION, Santa Clara, CA (US)

( * ) Notice: Subject to any disclaimer, the term of this patent is extended or adjusted under 35 U.S.C. 154(b) by 392 days.

(21) Appl. No.: 15/201,350

(22) Filed: Jul. 1, 2016

(65) Prior Publication Data
US 2018/0003975 A1    Jan. 4, 2018

(51) Int. Cl.
*G02B 27/01*    (2006.01)
*G02B 5/32*    (2006.01)
(Continued)

(52) U.S. Cl.
CPC .......... *G02B 27/0172* (2013.01); *G02B 5/32* (2013.01); *G03H 1/0236* (2013.01); *G03H 1/0402* (2013.01); *G03H 1/0891* (2013.01); *B82Y 20/00* (2013.01); *G02B 2027/0109* (2013.01); *G02B 2027/0174* (2013.01); *G03H 2001/043* (2013.01); *G03H 2001/0432* (2013.01); *G03H 2001/0439* (2013.01); *G03H 2270/21* (2013.01);
(Continued)

(58) Field of Classification Search
CPC ................ G02B 27/0172; G02B 5/32; G02B 2027/0109; G03H 1/0236; G03H 1/0402; G03H 1/0891; G03H 2270/21; G03H 2001/043; G03H 2270/55; G03H 2001/0439; G03H 2001/0432; Y10S 977/902; B82Y 20/00

See application file for complete search history.

(56) References Cited

U.S. PATENT DOCUMENTS 4,990,415 A * 2/1991 Yu ............................ G03H 1/02
                                                            430/2
5,499,117 A * 3/1996 Yin ........................... G03H 1/02
                                                            359/3
(Continued)

FOREIGN PATENT DOCUMENTS

JP    2004219496 A    8/2004
JP    2010027131 A    2/2010

OTHER PUBLICATIONS

Shimizu et al. (Simulator for computer-aided design of holograms, Opt. Eng. 40(11), pp. 2524-2532) (Nov. 2001).*
(Continued)

*Primary Examiner* — Kimberly N. Kakalec

(57) ABSTRACT

Disclosed herein are devices and methods to provide a holographic optical element (HOE) having a modified shape and a structural attribute. At least one wavefront may be used to cause a first structure change in a material, used for the HOE, in a first shape. The material used for the HOE may be changed from the first shape to the modified shape to cause a second structure change in the material. The structural attribute in the material may be provided from a combination of the first structure change and the second structure change.

10 Claims, 10 Drawing Sheets

(51) Int. Cl.
*G03H 1/02* (2006.01)
*G03H 1/04* (2006.01)
*G03H 1/08* (2006.01)
*B82Y 20/00* (2011.01)

(52) U.S. Cl.
CPC ....... *G03H 2270/55* (2013.01); *Y10S 977/902* (2013.01)

(56) References Cited

U.S. PATENT DOCUMENTS

| | | | | |
|---|---|---|---|---|
| 5,760,931 | A | * | 6/1998 | Saburi ................ G02B 27/0101 345/7 |
| 6,631,016 | B1 | * | 10/2003 | Klug ........................ G03H 1/26 359/22 |
| 2001/0033402 | A1 | | 10/2001 | Popovich |
| 2002/0001108 | A1 | * | 1/2002 | Yeo ...................... G02B 5/1814 359/8 |
| 2011/0236802 | A1 | | 9/2011 | Li et al. |
| 2015/0346685 | A1 | | 12/2015 | Ito et al. |
| 2016/0283618 | A1 | * | 9/2016 | Levola ................ G06F 17/5009 |
| 2017/0068095 | A1 | * | 3/2017 | Holland ........... B29D 11/00413 |
| 2017/0212290 | A1 | * | 7/2017 | Alexander ............. G03H 1/202 |

OTHER PUBLICATIONS

International Search Report received for PCT Patent Application No. PCT/US2017/035447, dated Aug. 22, 2017, 3 pages.

* cited by examiner

500

```
┌─────────────────────────────────┐
│ Use computer aided design tool to model │
│ a desired HOE in its final complex shape. │
│              510                │
└─────────────────────────────────┘
              │
┌─────────────────────────────────┐
│ Characteristics associated with the │
│ material and the process of shape change │
│ for the desired HOE are determined. │
│              520                │
└─────────────────────────────────┘
              │
┌─────────────────────────────────┐
│ Modify the modeled HOE of block 510 to │
│ account for the changes in the nano │
│ structure of the material that will be used │
│ to manufacture the desired HOE. │
│              530                │
└─────────────────────────────────┘
              │
┌─────────────────────────────────┐
│ Determine wavefronts for use during the │
│ manufacturing stage of the desired HOE. │
│              540                │
└─────────────────────────────────┘
```

```
┌─────────────────────────────────────┐
│  Optics that will be used during the│
│  manufacturing stage are designed.  │
│                 550                 │
└─────────────────────────────────────┘
                    │
┌─────────────────────────────────────┐
│  Use optics to produce recording    │
│  wavefronts (e.g., reference and    │
│  object wavefronts) on material that│
│  will be used for the desired HOE.  │
│                 560                 │
└─────────────────────────────────────┘
                    │
┌─────────────────────────────────────┐
│ Wavefront impinged material is      │
│ formed in the complex shape of the  │
│ desired HOE.                        │
│                 570                 │
└─────────────────────────────────────┘
```

FIG. 6

HOLOGRAPHIC OPTICAL ELEMENT DESIGN AND MANUFACTURING

TECHNICAL FIELD

Embodiments herein generally relate to head worn displays (HWD) and heads up displays. More particularly, embodiments herein generally relate to designing and manufacturing a holographic optical element (HOE) that may be used with a HWD.

BACKGROUND

Modern display technology may be implemented to provide head worn displays (HWD) and to see through the display and to see information (e.g., images, text, or the like) in conjunction with the see through display. Such displays can be implemented in a variety of contexts, for example, defense, transportation, industrial, entertainment, wearable devices, or the like.

In various HWD systems, an image may be reflected off a transparent projection surface to a user's eye to present an image in conjunction with a real worldview. HWDs provide a projection system and a lens that includes a holographic optical element (HOE). The projection system and the lens can be mounted to a frame to be worn by a user, for example, glasses, a helmet, or the like. During operation, the projection system projects an image onto an inside (e.g., proximate to the user) surface of the lens. The HOE reflects the image to an exit pupil (or viewpoint).

Generally, manufacturing an HOE first requires shaping the raw material of the HOE so that it can be used with a lens of a HWD, glasses or the like. Subsequently, an HOE recording step is performed. For example, HOE recording may be achieved, in one example, by recording an interference pattern of an wavefront object beam and a wavefront reference beam.

The foregoing HOE manufacturing technique is a reasonable approach if the final shape of the HOE is flat or cylindrical, as the HOE may be manufactured using a standard production process (e.g., roll-to-roll). However, HOEs that require complex shaping (e.g., spherical, toric or freeform) are not straightforwardly manufactured using conventional methods.

BRIEF DESCRIPTION OF THE DRAWINGS

FIG. 5 illustrates a logic flow for designing and manufacturing a holographic optical element (HOE).

FIG. 6 illustrates a continuation of the logic flow for designing and manufacturing an HOE.

DETAILED DESCRIPTION

Figure 2:
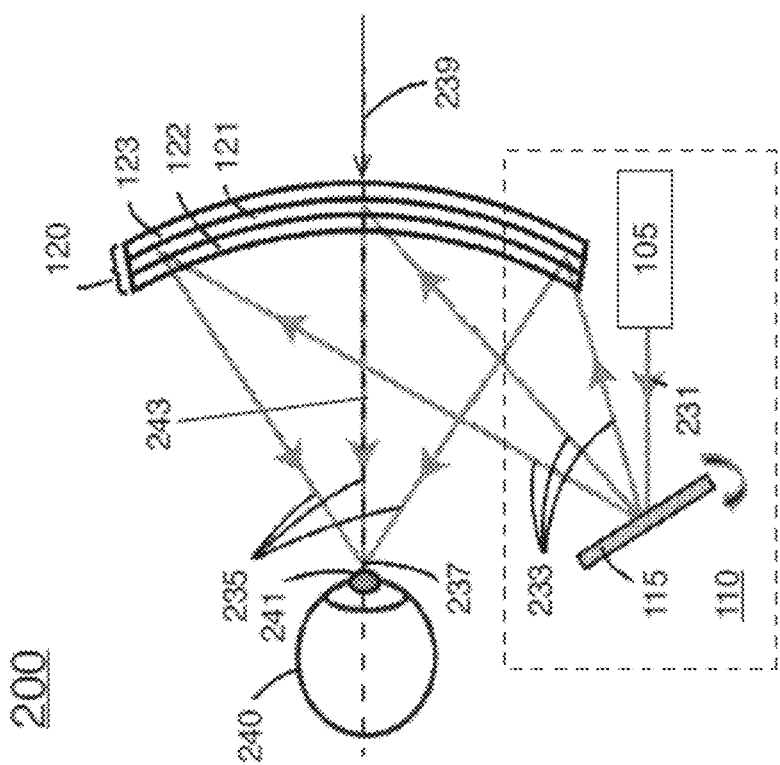
FIG. 2 illustrates an example second system.

Various embodiments may generally be elements used with head worn displays (HWDs). In general, HWDs provide a projection system and a lens that includes a holographic optical element (HOE). The projection system and the lens can be mounted to a frame to be worn by a user, for example, glasses, a helmet, or the like. During operation, the projection system projects an image onto an inside (e.g., proximate to the user) surface of the lens. The HOE reflects the image to an exit pupil (or viewpoint). Ideally, the exit pupil is proximate to one of the user's eyes, and specifically, to the pupil of the user's eye. As such, the user may perceive the reflected image.

Disclosed implementations provide devices and methods to manufacture and/or simulate an HOE having a modified shape and a structural attribute. The HOE may be used in an HWD. One or more wavefronts may be used to cause a first structure change in a material that will be used for the HOE. In some examples, the wavefronts may be incident on the material to cause the first structure change in the material while the material is in the first shape. The material used for the HOE may be changed from a first shape to the modified shape to cause a second structure change in the material. The structural attribute in the material may be provided from a combination the first structure change and the second structure change.

Said differently, in some embodiments, an HOE can be formed by initially impinging a number of wavefront(s) on a material to cause a first structure change in the material. Subsequently, the material can be shaped from a first shape to a modified shape to cause a second structure change in the material. The HOE can be formed from the material having the modified shape with a structural attributed based in part on a combination of the first and second structure changes. The HOE can be provided to redirect (e.g., diffract and/or reflect, or the like) incident light based on the structural attribute.

In one implementation, a method to manufacture a holographic optical element (HOE) includes impinging a wavefront on a material having a first shape, the wavefront to cause a first structure change in the material. The method to manufacture the HOE may further include shaping the material to a modified shape to cause a second structure change in the material, and forming the HOE, the HOE including the material having the modified shape and a structural attribute, the structural attribute based in part on a combination of the first structure change and the second structure change.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

Figure 1:
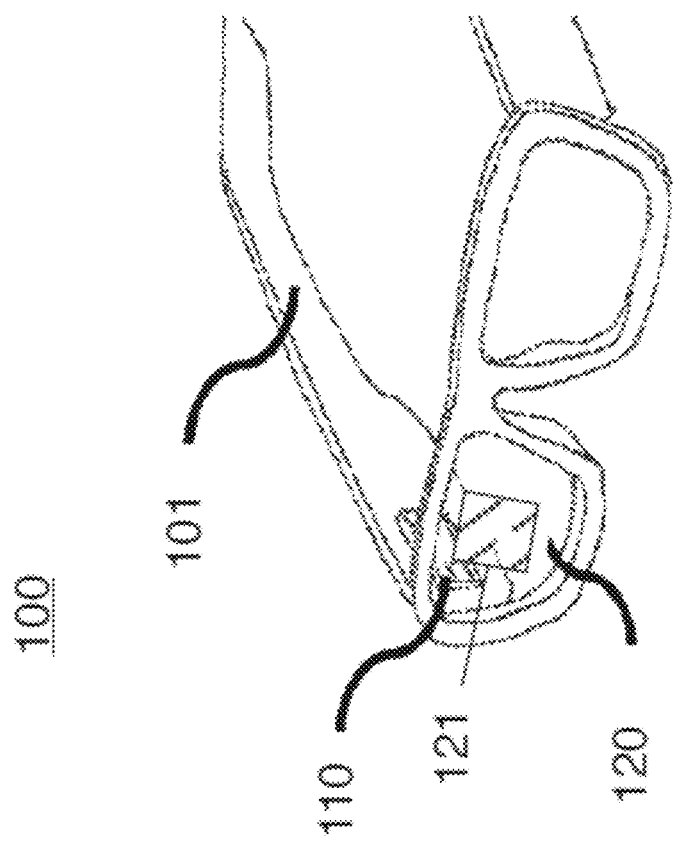
FIG. 1 illustrates an example first system.

FIG. 1 illustrates an example of device 100 arranged according to the present disclosure. It is noted, that the device of this figure is depicted implemented as a pair of glasses. However, with some examples, the device 100 may be embodied as a pair of glasses (e.g., as depicted), as a pair of binoculars, a monocular device (e.g., scope, or the like), as goggles, as a helmet, as a visor, as a wearable device, or the like. Embodiments are not limited in this context.

In general, the device 100 is configured to provide a virtual display. In some examples, the device 100 may provide a virtual display in conjunction with a real world view. The device 100 includes a glasses frame 101 and a projection system 110 mounted to the frame 101. Additionally, the device 100 includes a projection surface 120, which may be a lens, such as, for example, a glasses lens as depicted. For convenience and clarity in discussing the present disclosure, the projection surface 120 is referenced as lens 120. However, embodiments are not limited in this context.

The lens 120 is removably mounted in the frame 101. The lens 120 includes an HOE 121 (also referred to as a holographic optical combiner). The HOE 121 may be in a particular location and/or have particular optical characteristics to selectively reflect light incident on the lens 120 to an exit pupil (e.g., the exit pupil 237 shown in FIG. 2).

During operation, the projection system 110 projects light onto the lens 120. The projected light can correspond to virtual images. The lens 120, and specifically the HOE 121, reflects (or redirects) the light towards a user's eye. More particularly the HOE 121 reflects the projected light (e.g., the projected image, or the like) to an exit pupil. This is described in greater detail with respect to FIG. 2. With some examples, the lens 120 and the HOE 121 redirect the projected images and also transmit light from the external environment to the user's eye. As such, a virtual image and a real world image may be presented to the user. It is noted, that although the device 100 is depicted with a single projection system 110 and lens 120, the device 100 may include a projection system 110 and lens 120 including an HOE 121 for each eye. Examples are not limited in this context. It is further noted, the device of this figure is implemented with lens 120.

With some examples, the projection system 110 may comprise a light source, battery, and projector to project images onto the HOE 121. For example, the projection system 110 may comprise a scanning mirror to reflect and redirect light from the light source onto the HOE 121. In some examples, the scanning mirror may be a microelectromechanical system (MEMS) based scanning mirror. In some examples, the projection system 110 may comprise a panel micro display (e.g., light emitting diode (LED) panel, liquid crystal display (LCD) panel, or the like). Additionally, the projection system 110 may include control and graphics processing components configured to cause the system 110 to emit light from the light source and to scan and/or project the emitted light onto the lens 120 to project an image onto the HOE 121.

The lens 120 is described in greater detail below, for example, with respect to FIG. 2. However, a general description of the lens 120 is given here. With some examples, the lens 120 is an at least partially transparent surface with the HOE 121 disposed in the lens 120. During operation, the lens 120 and the HOE 121 may transmit light incident on a real world side of the lens 120 to provide a real world view. In some examples, the lens 120 is opaque and the lens 120 does not transmit light incident on a real world side of the lens 120. The HOE 121 may be disposed in a particular location of the lens 120 and/or may have particular optical characteristics to reflect an image projected onto an internal surface of the lens 120 to an exit pupil in a particular location. With some examples, the lens 120 may be sunglass lenses to reduce an amount or type of light transmitted through the lenses, for example, by polarization or absorption. With some examples, the lenses 120 may be prescription lenses to correct or augment light perceived from the real world and/or the virtual image.

Any of a number of lenses, like the lens 120, each with an HOE 121 in a different location and/or with different optical characteristics may be removably coupled to the frame 101 to provide a virtual image or a combination of a virtual image and a real world view.

In some examples, the lens 120 may comprise a layer of holographic material coated onto one or both sides of the lens. For example, the lens 120 may comprise a photopolymer coated lens where the photopolymer is holographically recorded to form the HOE 121. As another example, the lens 120 may comprise a photopolymer layer disposed between two lens surfaces (e.g., protective layers, transparent layers, or the like). As noted, the holographic material acts to redirect the light projected from the projection system 110 into the eye while transmitting the light from the environment into the eye.

It is important to note, that the projection system 110 may not necessarily need to be mechanically adjusted and/or repositioned with respect to the lens 120. Instead, the projection system 110 may be configured to project an image over an area of the lens 120 corresponding to the HOE 121 to project a virtual image to an exit pupil corresponding to the HOE 121.

FIG. 2 is a block diagram illustrating a top view of a system 200 including an example implementation of the device 100. In general, the exemplary implementation of the device 100 depicted in this figure is configured to project light to a single exit pupil 237 (e.g., proximate to, or directed at, a user's eye, or the like). That is, the device 100 is configured to reflect the image projected onto the HOE 121 to a virtual aperture (e.g., the exit pupil 237) in the optical system. The system 200 includes the projection system 110 including a light source 105 to emit a light beam 231 of at least one wavelength. Alternatively, the system 110 may receive light emitted from a source not included in the system. Examples are not limited in this context. The light beam 231 is incident on (or received by) a scanning mirror 115. The scanning mirror 115 rotates about a number of axes to scan the light beam 231 in angles 233.

The scanning mirror 115 scans the light beam 231 in angles 233 onto (or across) the lens 120 while the system 110 modulates or modifies the intensity of the scanned light beam 231 to correspond to a digital image. In particular, the scanning mirror 115 scans the light beam 231 over an area of lens 120 while the system 110 projects a digital image onto a portion of the area that includes the HOE 121.

In some examples, the lens 120 comprises an HOE 121 disposed between two protective layers 122 and 123. It is noted, that a variety of styles of HOEs may be implemented as the HOE 121. Furthermore, the HOE 121 may be manufactured by any of variety of manufacturing techniques, such as, for example, recording a hologram into a medium.

Examples are not limited in this context. A particular manufacturing technique of an HOE, according to one exemplary embodiment, is described in greater detail below.

The HOE 121 may be a combiner lens (e.g., a holographic optical combiner lens, or the like) that reflects light (e.g., off-angle light, or the like) incident on a first surface while transmitting light incident on a second opposite surface. Accordingly, the lens 120 reflects the light 233 as diffracted light 235 to an exit pupil 237. Thus, the lens 120 reflects and diffracts the light 233 to the entrance pupil 241 of a user's eye 240. Furthermore, the lens 120, and particularly the HOE 121, transmits light 239, which is incident on a front side of the lens 120 and HOE 121. As depicted, the line of sight 243 of the eye (e.g., corresponding to the eye pupil 241) is aligned with the exit pupil 237 and with the light 239. As such, the user may perceive a virtual image (e.g., as projected to exit pupil 237) in conjunction with a real world view (e.g., corresponding to light 239).

It is noted, that although only a single input pupil (e.g., light beam 231) and a single exit pupil (e.g., the exit pupil 237) are depicted, embodiments may be implemented to receive multiple input pupils and project an image with multiple exit pupils (e.g., based on a single input pupil or from multiple input pupils). Examples are not limited in this context.

The following will describe an approach for designing an HOE (e.g., the HOE 121). However, before describing the exemplary approach for designing an HOE, reference is made to FIG. 3, which illustrates a diagram of an exemplary system embodiment and in particular, depicts a platform 300, which may include various elements. The platform 300 may be utilized in the design and manufacturing phases of an HOE.

Figure 3:
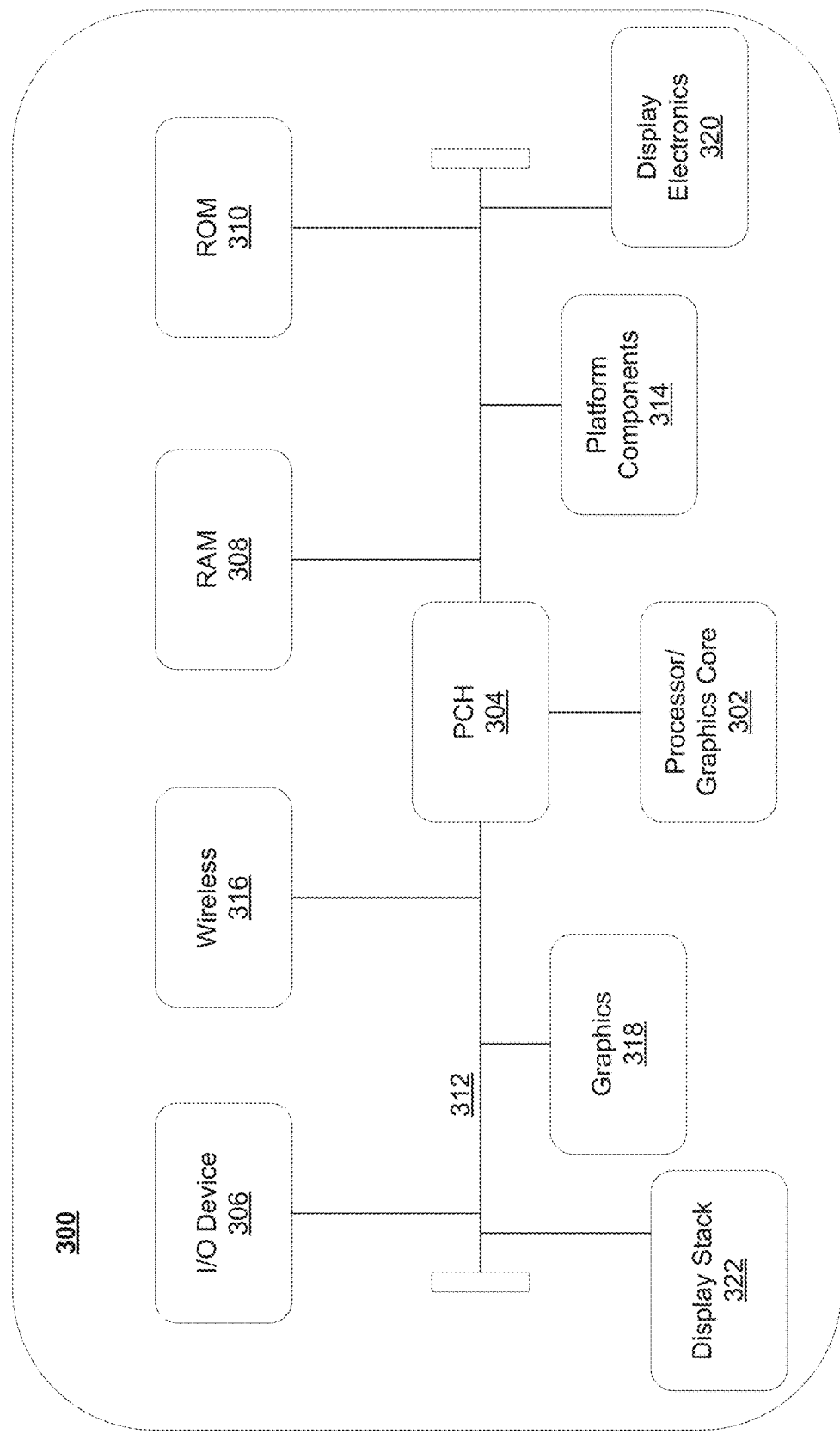
FIG. 3 depicts a platform (system) that may include a processor/graphics core.

FIG. 3 depicts that platform (system) 300 may include a processor/graphics core 302, a chipset/platform control hub (PCH) 304, an input/output (I/O) device 306, a random access memory (RAM) (such as dynamic RAM (DRAM)) 308, and a read only memory (ROM) 310, display electronics 320, projector 322, and various other platform components 314 (e.g., a fan, a cross flow blower, a heat sink, DTM system, cooling system, housing, vents, and so forth). System 300 may also include wireless communications chip 316 and graphics device 318. The embodiments, however, are not limited to these elements.

As depicted, I/O device 306, RAM 308, and ROM 310 are coupled to processor 302 by way of chipset 304. Chipset 3004 may be coupled to processor 302 by a bus 312. Accordingly, bus 312 may include multiple lines.

Processor 302 may be a central processing unit comprising one or more processor cores and may include any number of processors having any number of processor cores. The processor 302 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 302 may be multiple separate processors located on separate integrated circuit chips. In some embodiments processor 302 may be a processor having integrated graphics, while in other embodiments processor 302 may be a graphics core or cores.

Figure 4:
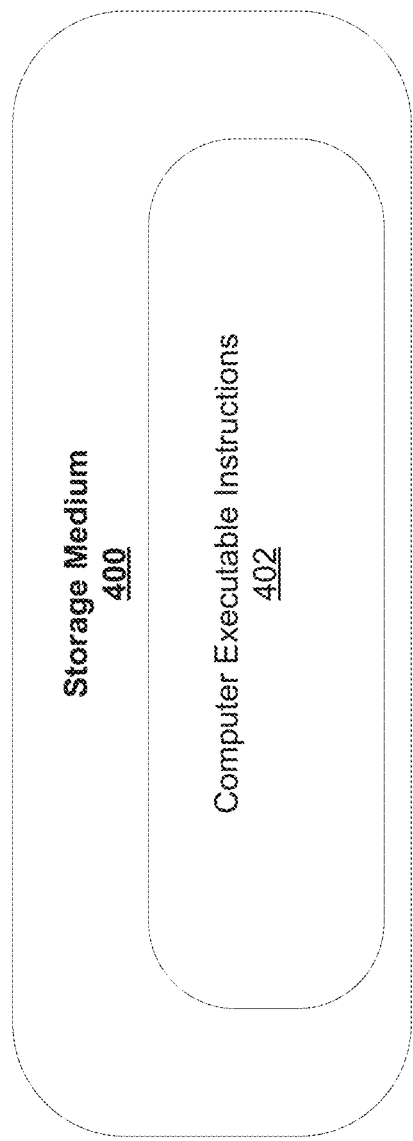
FIG. 4 illustrates an embodiment of a storage medium.

FIG. 4 illustrates an embodiment of a storage medium 400. The storage medium 400 may comprise an article of manufacture. In some examples, the storage medium 400 may include any non-transitory computer readable medium or machine readable medium, such as an optical, magnetic or semiconductor storage. The storage medium 400 may store various types of computer executable instructions e.g., 402). For example, the storage medium 400 may store various types of computer executable instructions to implement the HOE manufacturing techniques described herein. The storage medium 400 may be coupled platform system 300. For example, when coupled to the platform system 300, the computer executable instructions 402 may be executed by the platform 300 to aid in performing one or more techniques described herein (e.g., HOE manufacturing techniques). Furthermore, the storage medium 400 may store other information related to the design and manufacturing of an HOE.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

FIG. 5 illustrates a logic flow 500 for designing and manufacturing an HOE. The logic flow 500 may begin at block 510. However, the logic flow 500 may begin at a different block than the block 510. Furthermore, the logic flow 500 is not illustrated in particular order. A different order other than that illustrated may be used. Some or all of the blocks associated with the logic flow 500 may be embodied as computer executable instructions. Such computer executable instructions may be stored in the storage medium 400, or a plurality of disparate storage mediums. A computing device, such as the platform 300, may execute the stored computer executable instructions.

At block 510, a computer aided design tool is used to "model a desired HOE in its final complex shape." The computer aided design tool may be used to, based on the desired HOE in its final complex shape, define the shape of two wavefronts (an object wavefront and a reference wavefront) during the recording process. In the readout mode, the desired HOE is illuminated by a wavefront and it produces a modified wavefront through diffraction.

In some examples, design of the desired HOE makes use of a vector grading diffraction equation. Such a vector grading diffraction equation includes the use of a surface normal vector for the HOE surface, unit vectors from the object and reference point sources to a point on the HOE (e.g., an object wavefront and a reference wavefront), unit ray vectors for the incident and diffracted rays during the readout mode and the wavelengths used for the readout mode. The computer aided design tool may be used to vary the wavefront wavelengths. The vector grading diffraction equation also has an associated diffracted order number for the desired HOE. The wavefronts, object and reference, used during the design process of the desired HOE may be spherical or non-spherical.

At block 520, "characteristics associated with the material used for the desired HOE are determined." Specifically, the material used for the desired HOE, such as photopolymers, emulsions, crystals, or photoresist-based materials, will have various characteristics before and after it is formed in the complex shape of the desired HOE. One such characteristic is the nano structure and the change in the nano structure that occurs in the material of the desired HOE during recording and shaping into the complex shape of the desired HOE.

For example, a material used to form the desired HOE may have a generally flat shape (e.g., at the time of recording) with an ascertainable nano structure. The material used to form the desired HOE is processed, after recording in one example, to form the complex shape of the desired HOE. The process (e.g., heating and/or stretching) of forming the material in the complex shape will result in the nano structure being modified. Furthermore, the recording process may affect and change the nano structure of the material (e.g., due to shrinkage of the material during recording or material curing).

The change(s) that the nano structure undergoes during the forming and recording of the material used for the desired HOE may be stored in a storage medium (e.g., the storage medium 400). More specifically, a reference is stored relating to the nano structure properties of the material before it is formed in the complex shape (e.g., at the time of recording) and another reference is stored related to the nano structure properties of the material after it is formed in a complex shape. Similarly, a reference is stored relating to the nano structure properties of the material before recording and another reference is stored related to the nano structure properties of the material after recording. It may be beneficial to store a plurality of references related to the nano structure properties at intermediate steps in the forming process of the material. It may also be beneficial to store a plurality of references related to the nano structure properties over a duration of the recording.

The process of block 520 may be done in modeling software that may be linked to the computer aided design tool used in the process of block 510. More particularly, the modeling software may be used to provide a simulated model that shows the changes in the nano structure, belonging to the material that will be used to form the desired HOE, as a result of the recording and forming process.

At block 530, the modeled HOE of block 510 is modified "to account for the changes in the nano structure of the material that will be used to manufacture the desired HOE." Specifically, the nano structure characteristics determined and stored at block 520 may be provided to the computer aided design tool and used to particularly define the nano structure of the desired HOE. The defined nano structure of the desired HOE therefore takes into account the changes that occur in the nano structure during recording (e.g., before shaping of the HOE material) and during shaping of the HOE material into its complex shape. More particularly, a goal is to account for all nano structure changes that occur in the HOE material during recording and forming of the HOE material.

At block 540, revised "wavefronts for use during the manufacturing stage of the desired HOE" are determined. Specifically, the known changes in the nano structure as a result of recording and shaping of the material used for the desired HOE are used to calculate wavefronts that would impinge on the desired HOE and the wavefronts that will ideally exit from the desired HOE. In other words, once the changes that will occur in the nano structure as a result of recording using wavefronts (e.g., reference and object wavefronts) and the forming of the material used for the desired HOE having a particular shape are known, the recording wavefronts are determined that will result in the nano structure that will be in the desired HOE after recording and forming. The determined wavefronts are those that will be used during manufacturing of the desired HOE (e.g., during recording), and in one example, before the material of the desired HOE is formed in its final complex shape.

FIG. 6 illustrates a continuation of the logic flow 500 for designing and manufacturing an HOE. At block 550, "optics that will be used during the manufacturing stage are designed." For example, optics are designed to produce recording wavefronts (e.g., reference and object wavefronts) that will produce a nano structure in the material used for the desired HOE. The designed optics may be standard, freeform or adaptive optics. The designed optics may be used to produce wavefronts that impinge on the material in a roll-to-roll manufacturing arrangement. The wavefronts that impinge on the material cause a modification of the nano structure associated with the material. Subsequently, in one exemplary embodiment, the wavefront exposed material is shaped to form the final complex shape of the desired HOE. The process of shaping the wavefront exposed material may cause further changes in the nano structure associated with the material. Those further changes that occur in the nano structure during shaping were taken into consideration in the design of the optics to produce the recording wavefronts. Particularly, a goal is to provide recording wavefronts that create a first nano structure change in the material used for the desired HOE, knowing that a second nano structure change will occur when the material is shaped to form a complex shape of the desired a HOE. The sum of the first nano structure change and the second nano structure change should equal the nano structure of the HOE designed according to blocks 510-540.

At block 560, the optics designed at block 550 are used to "produce recording wavefronts (e.g., reference and object wavefronts) that impinge on the material that will be used for the desired HOE." In one implementation, the wavefronts impinge on the material provided from a roll-to-roll manufacturing arrangement. The wavefronts that impinge on the material cause a change in the nano structure of the material.

At block 570, the "wavefront impinged material is formed in the complex shape of the desired HOE." Forming the wavefront impinged material causes a further modification of the nano structure in the material. The further modification of the nano structure in the material provides the desired HOE having a complex shape with an expected nano structure, as designed according to the process of blocks 510-550.

Figure 7:
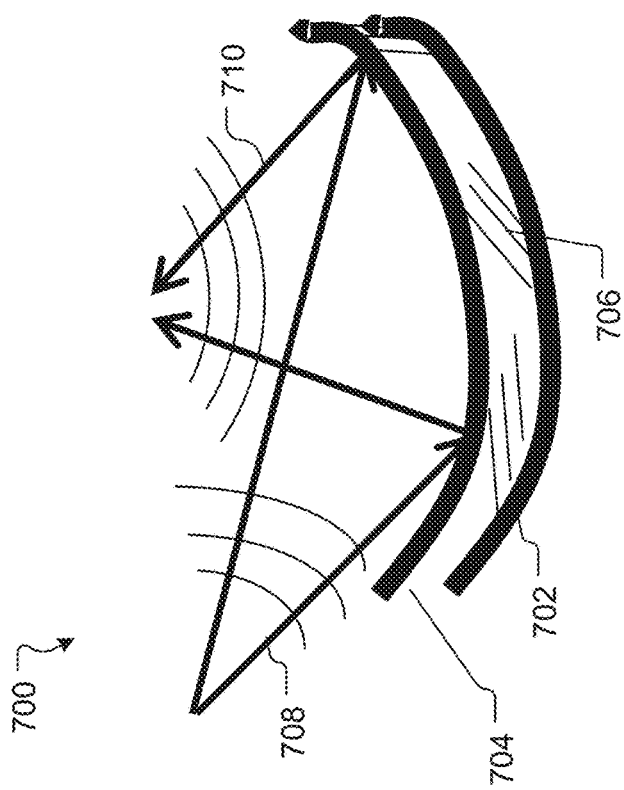
FIG. 7 illustrates a modeled HOE.

FIG. 7 illustrates a modeled HOE 700. In one implementation, the modeled HOE 700 is generated using a computer aided design tool. However, other computer aided design tools may also be used to model the HOE 700. The modeled HOE 700 is designed to have a complex shape 702 in the material 704 used for the HOE 700. In this example, the complex shape 702 is generally curved. However, the generally curved shape is only exemplary, as other shapes may be used as the complex shape 702.

The modeled HOE 700 may have a particular structural attribute 706. For example, the particular structural attribute 706 may be the nano structure of the material 704 in the complex shape 702. The modeled HOE 700 is designed to have a desired optical function. Specifically, the modeled HOE 700 is designed to receive an illuminating wavefront 708, whereby the modeled HOE 700 produces a modified wavefront 710 through diffraction. The nano structure the material 704 influences the behavior of the wavefronts 708 and 710.

Figure 8:
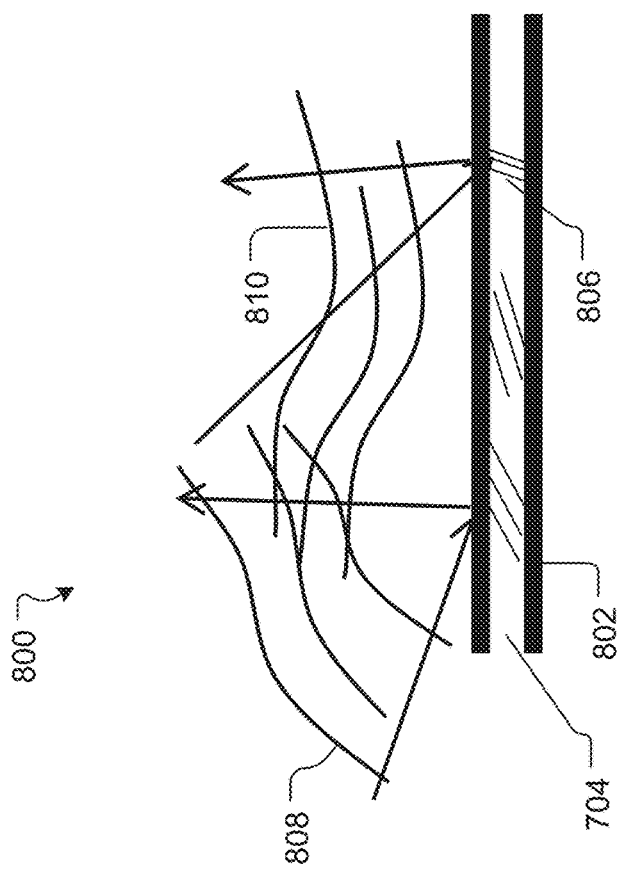
FIG. 8 illustrates a digitally unwrapped HOE.

FIG. 8 illustrates a digitally unwrapped HOE 800 in a shape 802 of the material 704. In general, the material 704 is flat. More specifically, the material 704 has a shape 802 used during a manufacturing phase of an HOE. The material 704 will have a particular structural attribute 806 in the shape 802 shown in the FIG. 8. The particular structural attribute 806 is different from the particular structural attribute 706. The particular structural attribute 806 may be a nano structure of the material 704 before recording and shaping of the material 704.

A reference is stored relating to the nano structure properties of the material 704 before it is formed in the complex shape 702 (e.g., at the time of recording; the shape 802) and another reference is stored related to the nano structure properties of the material 704 after it is formed in a complex shape 702. Similarly, a reference is stored relating to the nano structure properties of the material 704 before recording, and another reference is stored related to the nano structure properties of the material 704 after recording. It may be beneficial to store a plurality of references related to the nano structure properties at intermediate steps in the forming process of the material 704. Furthermore, it may be beneficial to store a plurality of references related to the nano structure properties over the duration of recording. A storage medium, such as the storage medium 400, may be used to store the nano structure references.

Recording wavefronts 808 and 810 (e.g., reference wavefront 808 and object wavefront 810) are shown in FIG. 8. The changes in the nano structure as a result of recording and shaping of the material used for the modeled HOE 700 are used to determine the wavefronts 808 and 810. In other words, once the changes that will occur in the nano structure as a result of recording using wavefronts 808 and 810 and the forming of the material 704 used for the modeled HOE 700 having a complex shape 702 are known through simulation, the recording wavefronts 808 and 810 are determined that will result in the nano structure (e.g., the particular structural attribute 706) that will be in the modeled HOE 700 after recording and forming. The determined wavefronts 808 and 810 are those that will be used during manufacturing of the modeled HOE 700, that is in one example, before the material 704 of the modeled HOE 700 is formed in the complex shape 702.

Figure 9:
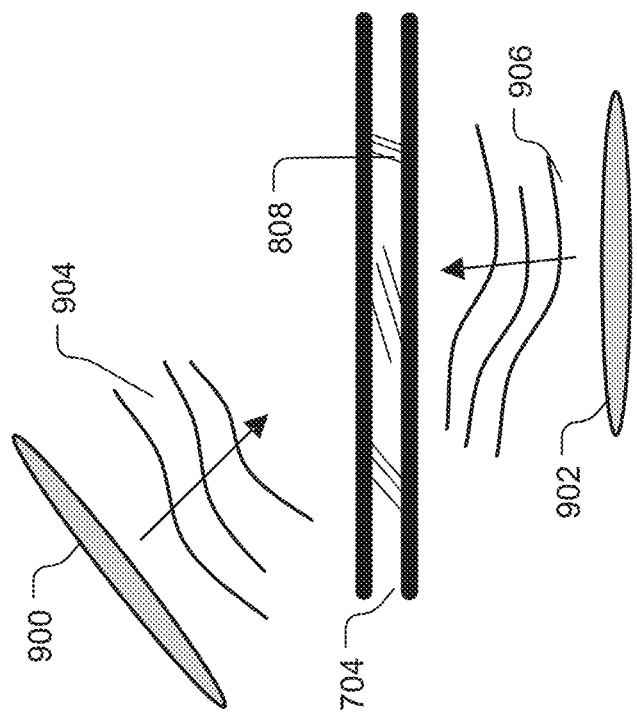
FIG. 9 illustrates designed optics that may be used to generate wavefronts during a manufacturing stage of the modeled HOE.

FIG. 9 illustrates designed optics 900 and 902 that may be used to generate recording wavefronts 904 and 906, respectively, during a manufacturing stage of the modeled HOE 700. The wavefronts 904 and 906 are designed to create a particular structural attribute 808 (e.g., nano structure) in the material 704. The created particular structural attribute 808 takes into consideration the further structural changes that will occur in the material 704 when it is formed in the complex shape 702. In particular, the combination of structural changes that occur during recording and shaping of the material 704 should cause the material 704 to have the particular structural attribute 706 referenced in the foregoing description.

Figure 10:
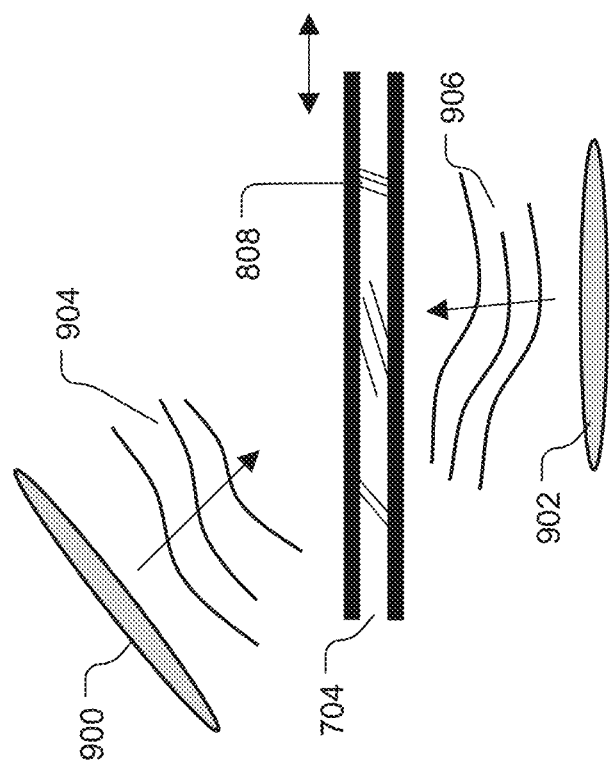
FIG. 10 illustrates using the optics during HOE manufacturing.

FIG. 10 illustrates using the optics 900 and 902 during HOE manufacturing. Specifically, the optic 900 generates the wavefront 904 that impinges on the material 704. The optic 902 generates the wavefront 906 that impinges on the material 704. The wavefronts 904 and 906 cause a structural attribute 808 in the material 704. Particularly, the wavefronts 904 and 906 change a nano structure of the material 704.

Figure 11:
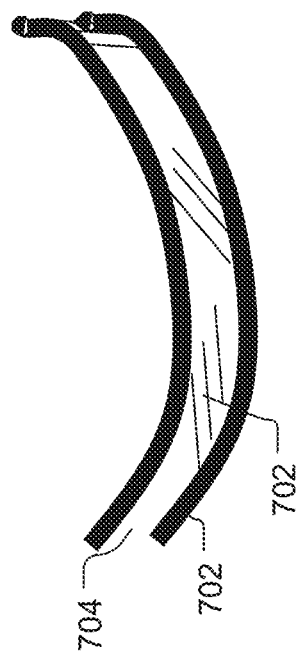
FIG. 11 illustrates shaping the material during HOE manufacturing.

FIG. 11 illustrates shaping the material 704 during HOE manufacturing. Specifically, the material 704 is shaped to have the complex shape 702. The process of shaping the material 704 into the complex shape 702 will cause a structural attribute 902 in the material 704. Particularly, shaping the material 704 will change to a nano structure of the material 704. In one exemplary embodiment, shaping the material 704 occurs after the wavefronts 904 and 906 are impinged on the material 704. Assuming shaping the material 704 occurs after the wavefronts 904 and 906 are impinged on the material 704, the material 704, shaped to have the complex shape 702, will have the particular structural attribute 706. Shaping the material 704 may be accomplished using a device that physically forms the material 704. Such a device may roll-to-roll manufacturing devices that include functionality that enables physically modifying the shape of the material 704.

Figure 12:
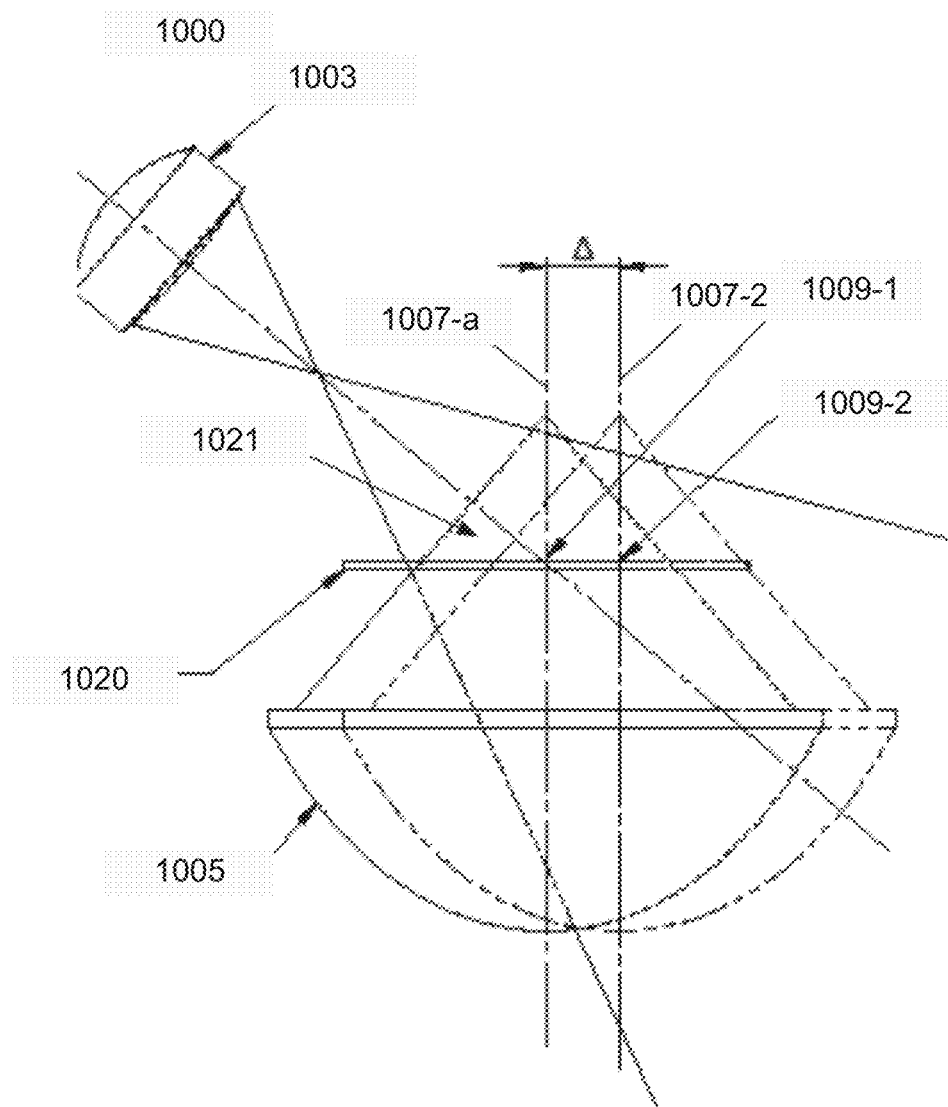
FIGS. 12-13 illustrate block diagrams of example systems for interfering a wavefront object beam with a wavefront reference beam to form an HOE
Figure 13:
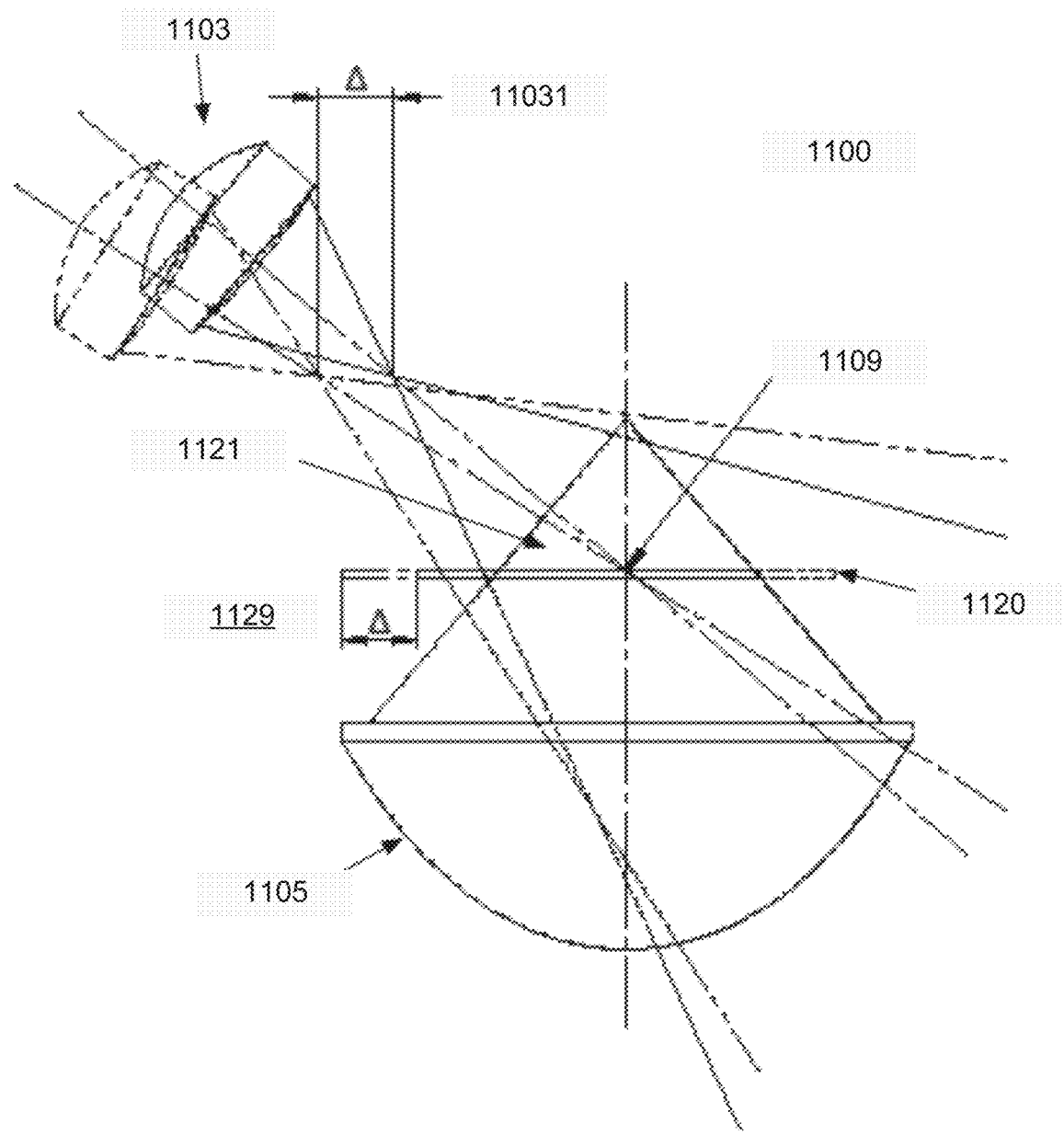

HOEs, such as, for example, the HOE 121, may be fabricated by interfering wavefronts, such as a reference beam and an object beam. In particular, the reference beam and the object beam are directed at the lens and intersect along a portion of the lens to form the HOE. FIGS. 12-13 are block diagrams of example systems for interfering an object beam with a reference beam to form an HOE.

Turning more specifically to FIG. 12, a system 1000 for recording an HOE 1021 in a lens 1020 is depicted. The system 1000 includes a fixed reference beam 1003 and a moveable object beam 1005 with a moveable center position 1007-a. Additionally, the lens 1020 is fixed. Accordingly, the object beam can be moved to form an HOE in different portions of the lens 1020. For example, the object beam 1005 is shown with a first center position 1007-1 and a second center location 1007-2. In particular, the object beam 1005 may be adjusted to have a center position 1007-1 to form an HOE with a center position 1009-1. Alternatively, the object beam 1005 may be adjusted to have a center position 1007-2 to form an HOE with a center position 1009-2.

Turning more specifically to FIG. 13 a system 1100 for recording an HOE 1121 in a lens 1120 is depicted. The system 1100 includes a fixed object beam 1105 and a moveable reference beam 1103. Additionally, the lens 1120 is configured to be moved. For example, the lens 1102 may be moved along displacement 1129. Accordingly, during operation, the reference beam 1103 is moved along trajectory 11031 to interfere with the fixed object beam 905 to form an HOE with a center position 1107. To form an HOE with a center position 1107 in a different location of the lens 1120, the lens may be moved, for example, along displacement 1129.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1

A method to manufacture a holographic optical element (HOE), the method comprising: impinging at least one wavefront on a material having a first shape, the at least one wavefront to cause a first structure change in the material; shaping the material to a second shape to cause a second structure change in the material; and forming a holographic optical element (HOE), the HOE comprising the material having the second shape and a structural attribute, the structural attribute based in part on a combination of the first structure change and the second structure change.

Example 2

The method to manufacture the HOE according to Example 1, further comprising impinging a plurality of wavefronts on the material having the first shape to cause the first structure change in the material.

Example 3

The method to manufacture the HOE according to Example 1, further comprising forming the HOE having the second shape and the structural attribute to conform to a defined design.

Example 4

The method to manufacture the HOE according to Example 1, wherein the material is a photopolymer, emulsion material, crystal, or photoresist-based material.

Example 5

A holographic optical element (HOE) manufactured by the method of Example 1.

Example 6

The method to manufacture the HOE according to Example 1, wherein the first shape of the material is flat, the second shape of the material is curved, and the structural attribute is a nano structure of the material.

Example 7

The method to manufacture the HOE according to Example 1, wherein the structural attribute is a nano structure, the first structure change in the material is a first nano structure change in material, and the second structure change in the material is a second nano structure change in the material.

Example 8

A method to design a holographic optical element (HOE), the method comprising: simulating, via a digital computer, a holographic optical element (HOE), the HOE comprising a material having a modified shape and a structural attribute; simulating, via the digital computer, a wavefront to cause a first structure change in the material while the material is in a first shape; and simulating, via the digital computer, the material changing from the first shape to the modified shape to cause a second structure change in the material, the structural attribute in the material based in part on a combination of the first structure change and the second structure change.

Example 9

The method to design the HOE of Example 8, wherein the structural attribute is a nano structure of the HOE.

Example 10

The method to designing the HOE of Example 8, wherein the first structure change in the material is a first nano structure change in the material.

Example 11

The method to designing the HOE of Example 10, wherein the second structure change in the material is a second nano structure change in the material.

Example 12

The method to designing the HOE of Example 8, wherein the structural attribute is a nano structure, the first structure change in the material is a first nano structure change in material, and the second structure change in the material is a second nano structure change in the material.

Example 13

The method to designing the HOE of Example 8, wherein the material is a photopolymer, emulsion material, crystal, or photoresist-based material.

Example 14

The method to designing the HOE of Example 8, further comprising determining, via the digital computer, at least one incident wavefront to impinge on the HOE to produce a diffracted wavefront influenced by at least the structural attribute of the material.

Example 15

The method to designing the HOE of Example 8, further comprising generating, via the digital computer, a plurality of wavefronts to cause the first structure change in the material while the material is in the first shape.

Example 16

The method to designing the HOE of Example 8, wherein the first shape is flat and the modified shape is curved.

Example 17

At least one non-transitory machine-readable storage medium comprising instructions that when executed by a computing device, cause the computing device to: simulate a holographic optical element (HOE), the HOE comprising a material having a modified shape and a structural attribute; simulate a wavefront to cause a first structure change in the material while the material is in a first shape; and simulate the material changing from the first shape to the modified shape to cause a second structure change in the material, the structural attribute in the material based in part on a combination of the first structure change and the second structure change.

Example 18

The least one non-transitory machine-readable storage medium of Example 17, wherein the structural attribute is a nano structure of the HOE.

Example 19

The least one non-transitory machine-readable storage medium of Example 17, wherein the first structure change in the material is a first nano structure change in the material.

Example 20

The least one non-transitory machine-readable storage medium of Example 19, wherein the second structure change in the material is a second nano structure change in the material.

Example 21

The least one non-transitory machine-readable storage medium of Example 17, wherein the structural attribute is a nano structure, the first structure change in the material is a first nano structure change in material, and the second structure change in the material is a second nano structure change in the material.

Example 22

The least one non-transitory machine-readable storage medium of Example 17, wherein the material is a photopolymer, emulsion material, crystal, or photoresist-based material.

Example 23

The least one non-transitory machine-readable storage medium of Example 17, further comprising the computing device to determine at least one incident wavefront to impinge on the HOE to produce a diffracted wavefront influenced by at least the structural attribute of the material.

Example 24

The least one non-transitory machine-readable storage medium of Example 17, further comprising the computing device to determine a plurality of wavefronts to cause the first structure change in the material in the first shape.

Example 25

The least one non-transitory machine-readable storage medium of Example 17, wherein the first shape is flat and the modified shape is curved.

Example 26

A holographic optical element (HOE), comprising: a shaped material having a structural attribute, the shaped material having the structural attribute provided by: impinging at least one wavefront on a material having a first shape, the at least one wavefront to cause a first structure change in the material; and shaping the material to a second shape to cause a second structure change in the material, the structural attribute based in part on a combination of the first structure change and the second structure change.

Example 27

The HOE according to Example 26, wherein the shaped material having the structural attribute is provided by impinging a plurality of wavefronts on the material having the first shape to cause the first structure change in the material.

Example 28

The HOE according to Example 26, wherein the material is a photopolymer, emulsion material, crystal, or photoresist-based material.

Example 29

The HOE according to Example 26, wherein the first shape of the material is flat, the second shape of the material is curved, and the structural attribute is a nano structure of the material.

Example 30

The HOE according to Example 26, wherein the structural attribute is a nano structure, the first structure change in the material is a first nano structure change in material, and the second structure change in the material is a second nano structure change in the material.

Example 31

The HOE according to Example 26, wherein the shaped material having a structural attribute is a curved shaped material having a predefined nano structure.

Example 32

A head worn display (HWD comprising the HOE of Example 26.

Example 33

An apparatus, comprising: means for impinging at least one wavefront on a material having a first shape, the at least one wavefront to cause a first structure change in the material; means for shaping the material to a second shape to cause a second structure change in the material; and means for forming a holographic optical element (HOE), the HOE comprising the material having the second shape and a structural attribute, the structural attribute based in part on a combination of the first structure change and the second structure change.

Example 34

The apparatus according to Example 33, further comprising means for impinging a plurality of wavefronts on the material having the first shape to cause the first structure change in the material.

Example 35

The apparatus according to Example 33, further comprising means for forming the HOE having the second shape and the structural attribute to conform to a defined design.

Example 36

The apparatus according to Example 33, wherein the material is a photopolymer, emulsion material, crystal, or photoresist-based material.

Example 37

The apparatus according to Example 33, wherein the first shape of the material is flat, the second shape of the material is curved, and the structural attribute is a nano structure of the material.

Example 38

The apparatus according to Example 33, wherein the structural attribute is a nano structure, the first structure change in the material is a first nano structure change in material, and the second structure change in the material is a second nano structure change in the material.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to manufacture a holographic optical element (HOE), the method comprising:
    impinging a plurality of wavefronts on a material having a first shape, the plurality of wavefronts to cause a first nano structure change in the material, the first nano structure change based on a second nano structure change, wherein the combination of the first nano structure change and the second nano structure change combine to form a structural attribute of a holographic optical element (HOE);
    shaping the material to a second complex shape to cause the second nano structure change in the material; and
    forming the HOE, the HOE comprising the material having the second complex shape and the structural attribute.

2. The method to manufacture the HOE according to claim 1, further comprising forming the HOE having the second complex shape and the structural attribute to conform to a defined design.

3. The method to manufacture the HOE according to claim 1, wherein the material is a photopolymer, emulsion material, crystal, or photoresist-based material.

4. A holographic optical element (HOE) manufactured by the method of claim 1.

5. The method to manufacture the HOE according to claim 1, wherein the first shape of the material is flat, the second complex shape of the material is curved, and the structural attribute is a nano structure of the material.

6. The method to manufacture the HOE according to claim 1, comprising determining the plurality of wavefronts based in part on the structural attribute and the second structure change.

7. The method to manufacture the HOE according to claim 1, wherein the first shape is flat and the second shape is curved.

8. A holographic optical element (HOE), comprising:
    a shaped material having a structural attribute, the shaped material having the structural attribute provided by:
        impinging a plurality of wavefronts on a material having a first shape, the plurality of wavefronts to cause a first nano structure change in the material, the first nano structure based on a second nano structure change, wherein the combination of the first nano structure change and the second nano structure change combine to form the structural attribute; and
    shaping the material to a second complex shape to cause the second nano structure change in the material.

9. The HOE according to claim 8, wherein the material is a photopolymer, emulsion material, crystal, or photoresist-based material.

10. The HOE according to claim 8, wherein the first shape is flat and the second shape is curved.

* * * * *